United States Patent [19]

Orshansky, Jr., deceased et al.

[11] 4,134,311
[45] Jan. 16, 1979

[54] HYDROMECHANICAL TRANSMISSION WITH TWO PLANETARY ASSEMBLIES THAT ARE CLUTCHABLE TO BOTH THE INPUT AND OUTPUT SHAFTS

[75] Inventors: Elias Orshansky, Jr., deceased, late of San Francisco, Calif., by Betty B. Orshansky, executrix; William E. Weseloh, San Diego, Calif.

[73] Assignee: Orshansky Transmission Corporation, New York, N.Y.

[21] Appl. No.: 813,705

[22] Filed: Jul. 7, 1977

[51] Int. Cl.² ............................................ F16H 47/04
[52] U.S. Cl. ..................................................... 74/687
[58] Field of Search ................. 74/687, 730, 732, 720, 74/720.5

[56] References Cited
U.S. PATENT DOCUMENTS

| | | | |
|---|---|---|---|
| 3,888,139 | 6/1975 | Orshansky, Jr. | 74/687 |
| 4,008,628 | 2/1977 | Orshansky, Jr. | 74/687 |

*Primary Examiner*—Leonard H. Gerin
*Attorney, Agent, or Firm*—Owen, Wickersham & Erickson

[57] ABSTRACT

A power transmission having two planetary assemblies, each having its own carrier and its own planet, sun, and ring gears. A speed-varying module is connected in driving relation to the input shaft and in driving relationship to the two sun gears, which are connected together. The speed-varying means may comprise a pair of hydraulic units hydraulically interconnected so that one serves as a pump while the other serves as a motor and vice versa, one of the units having a variable stroke and being connected in driving relation to the input shaft, the other unit, which may have a fixed stroke, being connected in driving relation to the sun gears. A brake grounds the first carrier in the first range and in reverse and causes drive to be delivered to the output shaft through the first ring gear in a hydrostatic mode, the first ring gear being rigidly connected to the output shaft. The input shaft also is clutchable to either the carrier or the ring gear of the second planetary assembly. The output shaft is also clutchable to the carrier of the second planetary assembly when the input is clutched to the ring gear of the second planetary assembly, and is clutchable to the ring gear of the second planetary assembly when the input is clutched to the carrier thereof.

3 Claims, 3 Drawing Figures

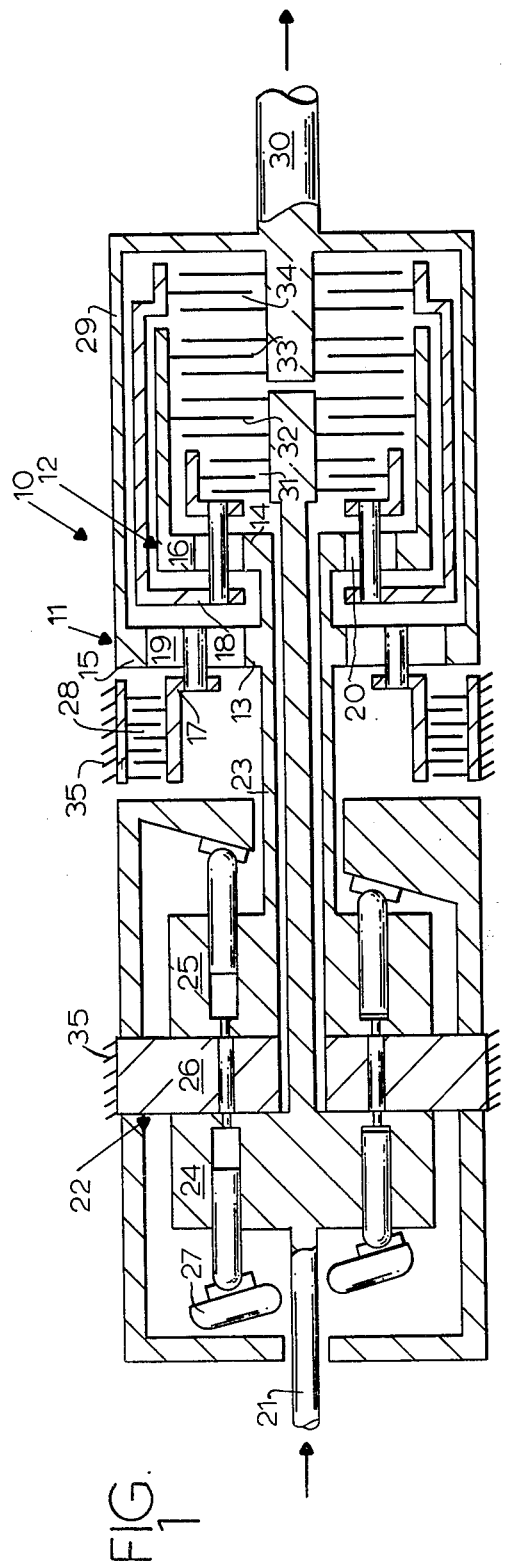
FIG. 1
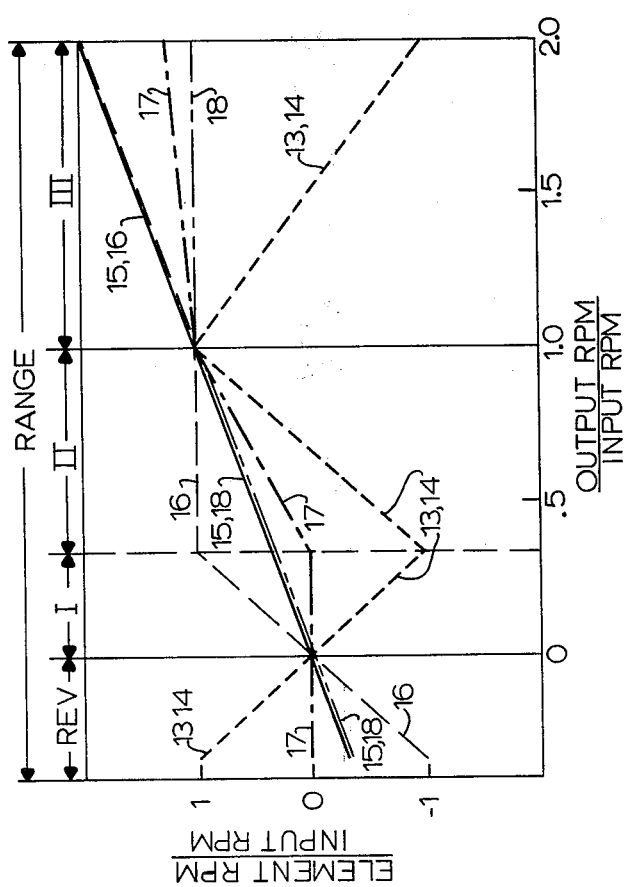
FIG. 2
FIG. 3

HYDROMECHANICAL TRANSMISSION WITH TWO PLANETARY ASSEMBLIES THAT ARE CLUTCHABLE TO BOTH THE INPUT AND OUTPUT SHAFTS

The Government has rights in this invention pursuant to Contract No. EY-76-C-03-1165 awarded by the U.S. Energy Research and Development Administration.

BACKGROUND OF THE INVENTION

This invention relates to an improved transmission. It may be considered an improvement on the hydromechanical transmission described in U.S. Pat. No. 3,888,139 which issued June 10, 1975, to Elias Orshansky, Jr.

The transmission of U.S. Pat. No. 3,888,139, and the transmission of the present invention each provide a hydromechanical infinitely variable transmission. Each provides for improved utilization of vehicle engine power by enabling the engine to operate within a narrow speed range which has been optimized for minimum emissions, maximum fuel economy and maximum power, regardless of vehicle operating conditions.

In U.S. Pat. No. 3,888,139 the hydraulic units used as a speed-varying means were driven by gears from either the input or the reaction or both. The present invention eliminates those gears, four gears altogether, and their bearings reduce the size and weight of the transmission and reduce the cost of the transmission.

It is also an object to provide a transmission which can weigh less than conventional transmissions.

The transmission of this invention has a concentric or coaxial construction and an entirely different hydrostatic start from the transmission of U.S. Pat. No. 3,888,139, in order to provide reduction in the number of parts, the size, the weight, and also the cost of the transmission.

In order to avoid having to use the extra gears which connected the planetary assemblies to the hydraulic units in U.S. Pat. No. 3,888,139, the hydraulic units in the present invention are especially designed to be installed in line with the planetary assemblies without a separate gear drive. This considerably reduces power losses, size, weight, and cost.

A conventional torque converter or manual transmission requires the imposition of many compromises upon the engine, because it must provide adequate performance over a wide range of torque and speed. The practice of most vehicle manufacturers of providing a selection of optional axle ratios for the vehicle is only one of the many attempts which have been made to reduce the compromise for any given application.

The infinitely variable transmission of this invention enables the engine to be operated at all times in a speed range in which it is capable of producing rated power. Therefore, vehicle performance in any given application can be maintained or even improved while utilizing a smaller engine. In contrast, infinitely variable transmissions of the pure hydrostatic type are limited to applications where significant power losses can be tolerated in return for the benefits of improved transmission ratio control.

Hydromechanical transmissions offer the control benefits of hydrostatic transmission, and, since only a portion of the engine power is transmitted by the hydraulic units, they provide a means for removing the performance barrier of excessive power losses. The extent to which any hydromechanical transmission can accomplish this is a function of the percentage of power which must be transmitted hydraulically.

The new transmission hereof can transmit high horsepower over a wide range of output speed variation at a constant input speed and horsepower. It differs from the previous transmissions in its ability to transmit power over a wide range with a minimum of transmitted hydraulic horsepower, and a minimum of installed hydraulic horsepower. It also provides full engine braking over its entire range of operation.

The invention avoids the pitfalls of excessive complexity, speeds, or loads in the gear train. Maximum reliability and minimum cost have been obtained by utilizing standard commercial hydraulic unit design practice to provide units which are operated totally within their long-life rated conditions of speed and power. In addition, the clutches can utilize the same low-cost paper elements presently employed in high production automobile torque converter transmissions. For a comparable power rating, a smaller number of elements than in a torque converter power shift transmission can be utilized, because at all shift points the clutch elements are virtually synchronous. The number of elements is, therefore, a function not of their thermal capacity, but of their steady-state torque capacity.

This new transmission is valuable for use in passenger and competition cars, highway and off-highway trucks, buses, agricultural and construction equipment, military vehicles, and industrial drives and machine tools.

With this invention it is possible to design transmissions having an extremely wide range of speed and torque variation at full power. This is required in construction and off-highway equipment, for example, where torque multiplication of the order of 18:1 and 24:1 may be encountered. Machine tool drives may require even wider ranges, and they are possible.

The use of this transmission in a piston-engine vehicle enables reduction of exhaust emissions and improvement in the specific fuel consumption by programming the engine to operate within its optimum range under all road conditions without regard to transmission torque output requirements. Both hydrocarbon and nitrogen oxide emissions can be minimized by optimizing the engine for operation in a specific narrow range. In addition, a smaller engine may be utilized for any application, as the transmission enables full engine power to be developed at any vehicle speed except for the lower speeds where the vehicle is traction limited. It is particularly desirable to operate turbocharged diesel engines in a narrow range of speed.

Rotary combustion engines can use this new transmission with the same advantages as for piston engines. The benefit in reduction of hydrocarbon emissions is there of a much greater magnitude, however, due to the high rate of change in emission characteristics for rotary combustion engines with respect to engine speed.

Gas turbines would also be benefited significantly by this invention. Manufacturing cost is a major drawback in producing a turbine today. This, to a large degree, is a function of the complexity required in the design of a turbine for use under the varying torque and speed conditions of a road vehicle. With the hydromechanical transmission of this invention, the turbine can be programmed to operate only under those conditions during which it is most efficient. Therefore, a single-shaft turbine becomes feasible, as it is more economical to manufacture than the two-shaft design normally proposed for vehicle application. Since constant-speed operation is feasible, the problems in connection with the throttle response time of a turbine do not arise. Because there is an infinite variation in speed and torque in the transmission, and no interruption of power flow occurs at any time, the turbine is never unloaded.

SUMMARY OF THE INVENTION

The power transmission of the invention includes, in combination with input means and output means, two planetary assemblies, each having its own carrier and its own planet, sun, and ring gears. Both of the sun gears are connected together on a common shaft, and a speed-varying module connected to the input drives the sun gears. The speed-varying module may comprise a pair of hydraulic units hydraulically interconnected so that one serves as a pump while the other serves as a motor and vice versa, one of the hydraulic units being connected in driving relation to the input, and the other being connected in driving relation to the sun gears.

A brake may be used for grounding the first carrier and causing the drive from the speed-varying module through the first set of planetary gears to be delivered to the output means through the first ring gear, which is rigidly connected to the output means. A first clutching arrangement can connect the second carrier to the input means while the second ring gear is connected with the output means. A second clutching arrangement can connect the second ring gear to the input means while the second carrier is connected to drive the output means.

The brake is a low-range clutching means used for both reverse and for starting in a hydrostatic Range I; the speed-varying module can be run in reverse, forward, or zero drive, and at varying speeds in forward or reverse, such as by respective strokings of a controlling wobble-plate.

The speed of the ring gear of the second planetary assembly increases during forward transmission drive in Range I and at the end of that range becomes equal to the speed of the input shaft. At that point, this second ring gear is clutched to the input shaft and the second carrier is clutched to the output shaft, and then the brake is released. The transmission is now hydromechanical and is in Range II.

During Range II, the speed of every element of the two planetary assemblies is either at or approaching the speed of the input shaft, and at the end of Range II, when every element reaches that speed, a shift is made into Range III by clutching the output shaft to the second ring gear and the input shaft to the second carrier. Then the clutches for Range II are disengaged.

In Range III, the second carrier stays at the speed of the input shaft, while the two ring gears, rotating at the output speed, continue to increase in speed.

The range shifts in this new transmission occur at synchronized speeds, without interruption of power flow on either the upshift or the downshift. The starting and reverse ranges are hydrostatic and are not considered part of the working ranges. In most cases, the starting and reverse ranges operate at less than maximum power and may approach a maximum constant torque, since maximum output torque may be limited by either maximum pressure or traction. The working ranges are considered to be Ranges II and III, which may operate at full and constant horsepower.

The present invention enables extending the ratio range while employing only two planetary assemblies, both simple planetary assemblies. One of these planetary assemblies serves as the drive in both of the hydromechanical ranges, the ring gear and the carrier of that assembly alternating in function, so that one of them serves as the output member while the other is the input member, and vice versa. The sun gear of this same planetary assembly is the reaction member in both of the hydromechanical ranges. By minimizing the gearing, manufacturing cost is minimized.

BRIEF DESCRIPTION OF THE DRAWINGS

In the drawings

FIG. 1 is a diagrammatic view in elevation and in section of a transmission illustrating the principles of this invention.

FIG. 2 is a brake and clutch engagement and range diagram.

FIG. 3 is a speed lines diagram with the ratio of output speeds to input speeds, in r.p.m. being plotted against the ratio of the speeds of the planetary members to the input speeds in r.p.m. The three forward ranges and the reverse range are identified.

DESCRIPTION OF THE PREFERRED EMBODIMENT

A transmission 10 of this invention has two planetary assemblies 11 and 12, having respective sun gears 13 and 14; respective ring gears 15 and 16; and respective carriers 17 and 18 with respective planet sets 19 and 20.

An input shaft 21 drives a speed-varying hydraulic module 22, the other end of which is suitably connected to a hollow shaft 23 that carries the two sun gears 13 and 14. The module 22 comprises a variable-displacement hydraulic unit 24 in driving relationship with a fixed-displacement hydraulic unit 25, with hydraulic fluid transmitted between them through a stationary port plate block 26. A wobble plate 27 is provided for the hydraulic unit 24.

A brake 28, when engaged, holds the first carrier 17 stationary, i.e., relative to a main frame 35. The first ring gear 15 is rigidly connected to or directly mounted on a drum 29 which is secured to an output shaft 30.

There are four clutches, which work in pairs: a clutch 31 for connecting the input shaft 21 to the second carrier 18, a clutch 32 for connecting the input shaft 21 to the second ring gear 16, a clutch 33 for connecting the second ring gear 16 to the output shaft 30, and a clutch 34 for connecting the second carrier 18 to the output shaft 30. The clutches 32 and 34 are engaged in Range II, and the clutches 31 and 33 are engaged in Range III.

The input shaft 21, output shaft 30, hydraulic units 24 and 25, and planetary assemblies 11 and 12, are all coaxial.

When the brake 28 is engaged, the first planetary gears 19 rotate but are arrested in their planetary motion. This makes a reversing drive between the first sun gear 13 and the first ring gear 15, causing a rotation of the third ring gear 15 which is reversed in rotation to that of the first sun gear 13.

The low-range brake 28 is engaged for starting (and also for reverse), causing the driving connection between the sun gear 13 and the drum 29 through the planetary gears 19 and the ring gear 15, causing the first ring gear 15 to run in a reverse direction and at a reduced speed with respect to the sun gear 13. The sun gear 13 itself is driven by the speed-varying module 22 during starting and reverse. In this region the drive is purely hydrostatic, and when the variable-displacement hydraulic unit 24 is on zero stroke, the vehicle is at a standstill, since no drive is then coming through the speed-varying module 22 and since the brake 28 is engaged.

If the wobble plate 27 of the variable-displacement unit 24 is stroked in one direction, the transmission 10 is in reverse, and if the wobble plate 27 is stroked in the opposite direction, the transmission 10 is in forward. When the wobble plate 27 is stroked in forward, the sun gear 13 traverses in speed from zero to a negative speed, as shown in Range I in FIG. 3, and with the carrier 17 of the first planetary assembly 11 grounded by the brake 28, the first ring gear 15 increases from zero output speed, as shown in Range I in FIG. 3.

During Range I, the second planetary assembly 12 transmits no power, the transmission 10 being in its hydrostatic mode. The second sun gear 14, decreases in speed exactly with the first sun gear 13, the second carrier 18 gains speed by virtue of having the clutch 34 engaged, and the second ring gear 16 gains speed even faster. Alternately, the clutch 32 may be engaged in Range I.

When the forward speed of the second ring gear 16 becomes equal to the forward speed of the input shaft 21, the clutches 32 and 34 are engaged, and the transmission 10 goes into Range II, the brake 28 then being released. The transmission 10 is then in its hydromechanical mode.

The drive is then from the input shaft 21 through the second ring gear 16 and the second carrier 18 to the output shaft 30. The first ring gear 15 from then on has no driving function, and the low-range brake 28 may simply slip, producing some loss, but such losses are usually very low.

When the end of Range II is reached, the speeds of all the planetary elements are identical—exactly the speed of the input shaft 21 (as is the output shaft 30), and it is thus possible to engage the high-range second clutch arrangement—clutches 31 and 33 to put the transmission into the high Range III, immediately thereafter releasing the clutches 32 and 34.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A power transmission comprising:
   a stationary frame,
   input means,
   output means,
   first and second planetary assemblies each having a sun gear, a ring gear, and a carrier with planet gears, said sun gears being rigidly connected together, the ring gear of said first planetary assembly being rigidly connected to said output means,
   a reversible speed-varying module connecting said input means to said sun gears,
   braking means for releasably connecting said carrier of said first planetary assembly to said frame, whereby when said braking means is engaged, said output means is driven from said input means through said speed-varying module and said first planetary assembly,
   first releasable clutching means for connecting said input means to said carrier of said second planetary assembly,
   second releasable clutching means for connecting said input means to said ring gear of said second planetary assembly,
   third releasable clutching means for connecting said ring gear of said second planetary assembly to said output means, when said first releasable clutching means is engaged, and
   fourth releasable clutching means for connecting said carrier of said second planetary assembly to said output means when said second releasable clutch means is engaged.

2. The power transmission of claim 1 wherein said speed-varying module comprises:
   a pair of hydraulic pump-motor units hydraulically interconnected so that one serves as a pump while the other serves as a motor and vice versa, and
   a first said hydraulic pump-motor unit being connected in driving relation to said input and a second said hydraulic pump-motor unit being connected to said first sun gear.

3. A power transmission according to claim 2 wherein said first hydraulic pump-motor unit is variable in stroke and runs during operation at constant speed while said second pump-motor unit is fixed in stroke and variable in speed.

* * * * *